Oct. 11, 1938.  L. H. COLBERT  2,133,161
ELECTRIC CONTROL FOR POWER PRESSES AND THE LIKE
Filed Dec. 29, 1937  4 Sheets-Sheet 1

INVENTOR.
Lester H. Colbert
BY Harry P. Canfield
ATTORNEY.

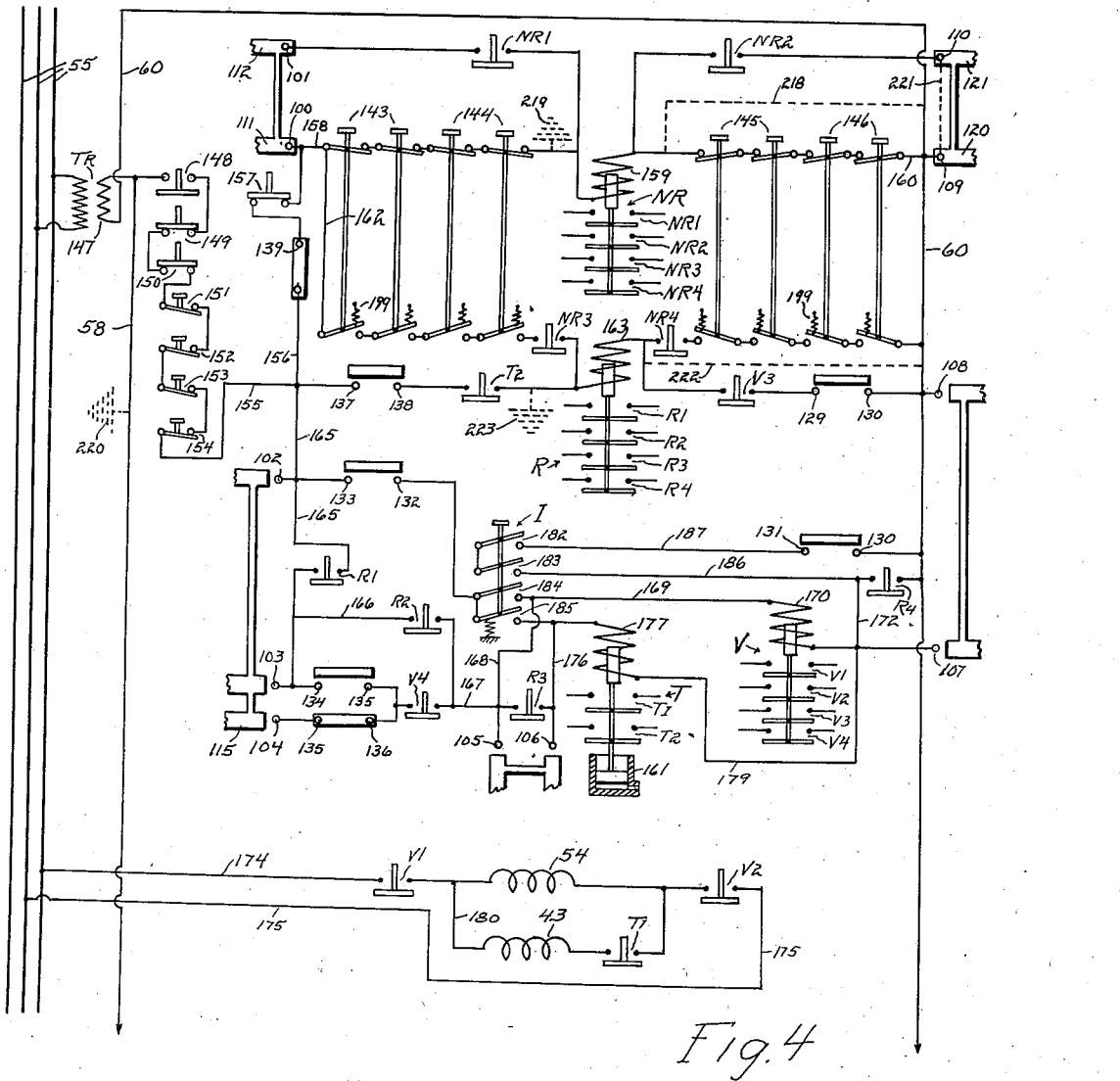

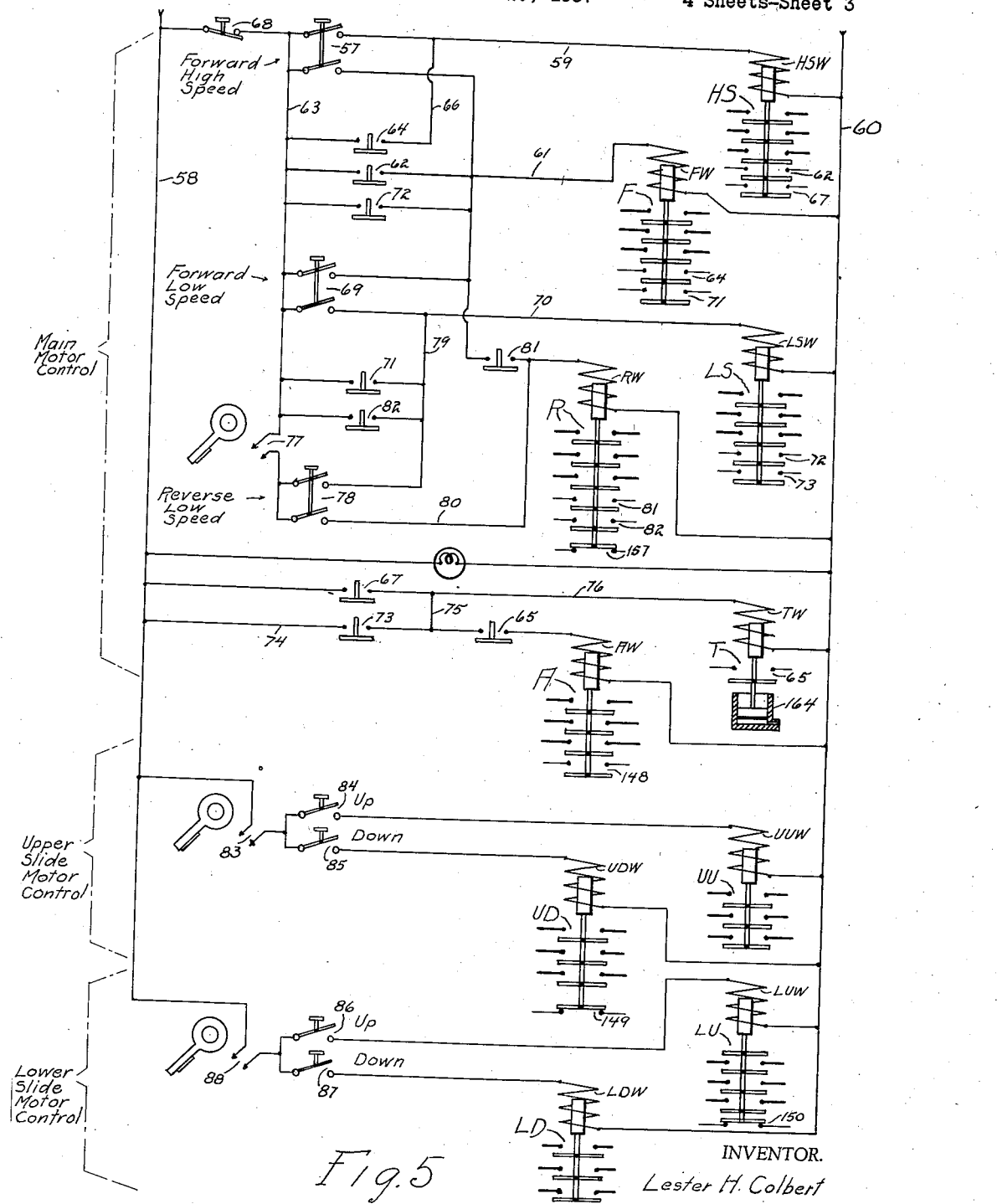

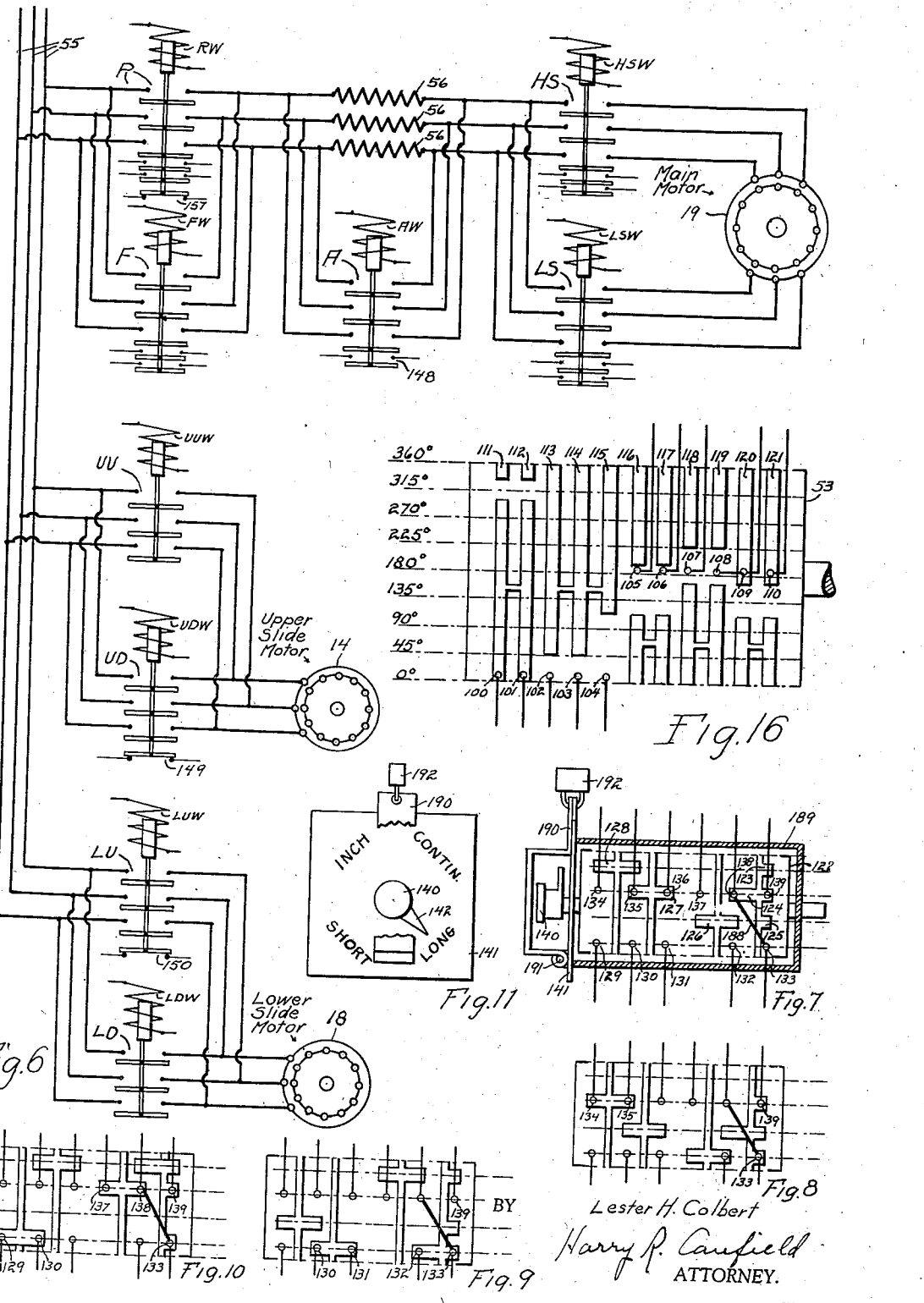

Patented Oct. 11, 1938

2,133,161

UNITED STATES PATENT OFFICE 2,133,161

ELECTRIC CONTROL FOR POWER PRESSES AND THE LIKE

Lester H. Colbert, Cleveland Heights, Ohio, assignor to The Clark Controller Company, Cleveland, Ohio, a corporation of Ohio Application December 29, 1937, Serial No. 182,231

31 Claims. (Cl. 192—142)

This invention relates to electric control systems for controlling the application of electric motor power to driven apparatus.

The invention has particular application to machine tools, and relates more particularly to safety features of the power control by which the various operations of the elements of the machine tool are made to occur at the proper time and under predetermined conditions to avoid damage to the machine itself and the work therein, and by which the operators of the machine are protected from injury.

Inasmuch as my invention has particular application to power-operated presses, it will be described herein as applied to that use.

Large power-operated presses such as are used, for example, to press-form metal sheets into motor car body panels are well known. They usually comprise upper and lower die-carrying heads and a main motor for forcing the upper die downward into the lower die with the metal to be formed therebetween. The main motor runs continuously. A clutch is provided to drive the press by the motor, that is to say, to move the upper die downwardly to perform a pressing operation and to then withdraw it upwardly; and a brake is provided to stop the press when the motor is disconnected by the clutch, after an operation is completed.

To set up or adjust the press, auxiliary motors are employed to raise or lower the die-heads on the machine to position the dies for the correct amount of pressure on the work, and to properly space the upper and lower heads for dies of different metal thicknesses, and to dispose the working level of the dies at suitable height. The die-heads may be adjustably moved on slides, and such motors are usually referred to as slide motors.

The main motor may be driven in the forward or in the reverse direction, the latter particularly for setting-up operations. The clutch may be "inched" to momentarily operate the press or upper head thereof, while setting up the dies and trying out the press preparatory to production.

It requires a number of operators to tend a press of large size, to put the worksheets thereinto and remove them therefrom after forming, and the press is started by the operators by means of push-buttons or other control-contactors. In order to protect the operators from injury, it has been proposed to provide two such push-buttons for each operator so as to occupy both of his hands, and to arrange these contactors all in series so that all of them must be operated at the same time before an operation at the press may be initiated, and to so locate these contactors that all parts of the operator's body will be out of the path of the descending die-head, and to require that the contactors be held operated until the die-head has descended beyond the danger point to insure that the operators will not be injured.

Control systems of this general class are illustrated and described in the patents to James J. Mellon, No. 1,993,413, March 5, 1935; and No. 2,065,820, December 29, 1936, to which reference may be had.

It is among the objects of the present invention:

To provide a control system of the class referred to having a plurality of operator's control-contactors for effecting an operation of the machine and provided with means to prevent the machine from making a repeat operation, even if the operators fail to release their control-contactors after the machine has operated.

To provide an improved control system of the class referred to comprising means for reversing the main motor and for preventing any operation of the press except "inching" thereof when the motor is in reverse;

To provide an improved control system of the class referred to comprising means to prevent "inching" operations except when the main motor is running;

To provide in a control system of the class referred to, improved means to prevent operation of the press except when the main motor is running at substantially full speed;

To provide a control system of the class referred to operated by operator's control contactors in an improved manner;

To provide a control system of the class referred to having means to change the operating condition of the control and provided with improved means to prevent unauthorized changes in the control;

To provide a control system of the class referred to having improved control circuits arranged to be locked against unauthorized use in an improved manner;

To provide a control system of the class referred to having improved means whereby an accidentally developed "ground" in the system or in the supply mains leading thereto cannot effect an operation of the system.

Other objects will be apparent to those skilled in the art to which my invention appertains.

My invention is fully disclosed in the following description taken in connection with the accompanying drawings in which:

Fig. 4 is a diagrammatic representation of an electric control system, embodying a part of my invention, for controlling the clutch and brake of the press of Fig. 1 in the normal operation thereof, and for effecting "inching" operations of the press;

Fig. 5 is a diagrammatic view of the control system, embodying a part of my invention, for starting and stopping and reversing the main motor of the press, of Fig. 1, and for starting and stopping and reversing the slide motors of the press; and the view may be considered as a continuation of the control system of Fig. 4;

Fig. 6 is a diagrammatic representation of an electric system by which power is supplied to the main motor and to the slide motors, of Fig. 1, under control of the control-system of Fig. 5;

Fig. 7 is a diagrammatic view in developed form of a drum-type master-controller by which certain functions performed by the system of Fig. 4 may be controlled;

Figs. 8, 9 and 10 are views of the controller of Fig. 7, showing other operative functions thereof;

Fig. 11 is an elevational view of a dial and handle which may be employed with the drum-controller of Figs. 7 to 10 to operate it, and to indicate the four operative positions thereof; and to lock it in any operated position;

Fig. 12 is a diagrammatic view of a contactor mechanism of the push-button type, which may be utilized in the system of Fig. 4;

Fig. 13 is a diagrammatic plan view of a part of the mechanism of Fig. 12, illustrating a mode of operation thereof by means of a lock and key;

Fig. 14 is a view of a lock and key operated control-contactor similar to a part of Fig. 12;

Fig. 15 is a view similar to Fig. 13 illustrating a mode of operation by means of a lock and key of the contactor of Fig. 14;

Fig. 16 is a diagrammatic view of a drum-controller in developed form shown in elevation in Fig. 1.

Figure 1:
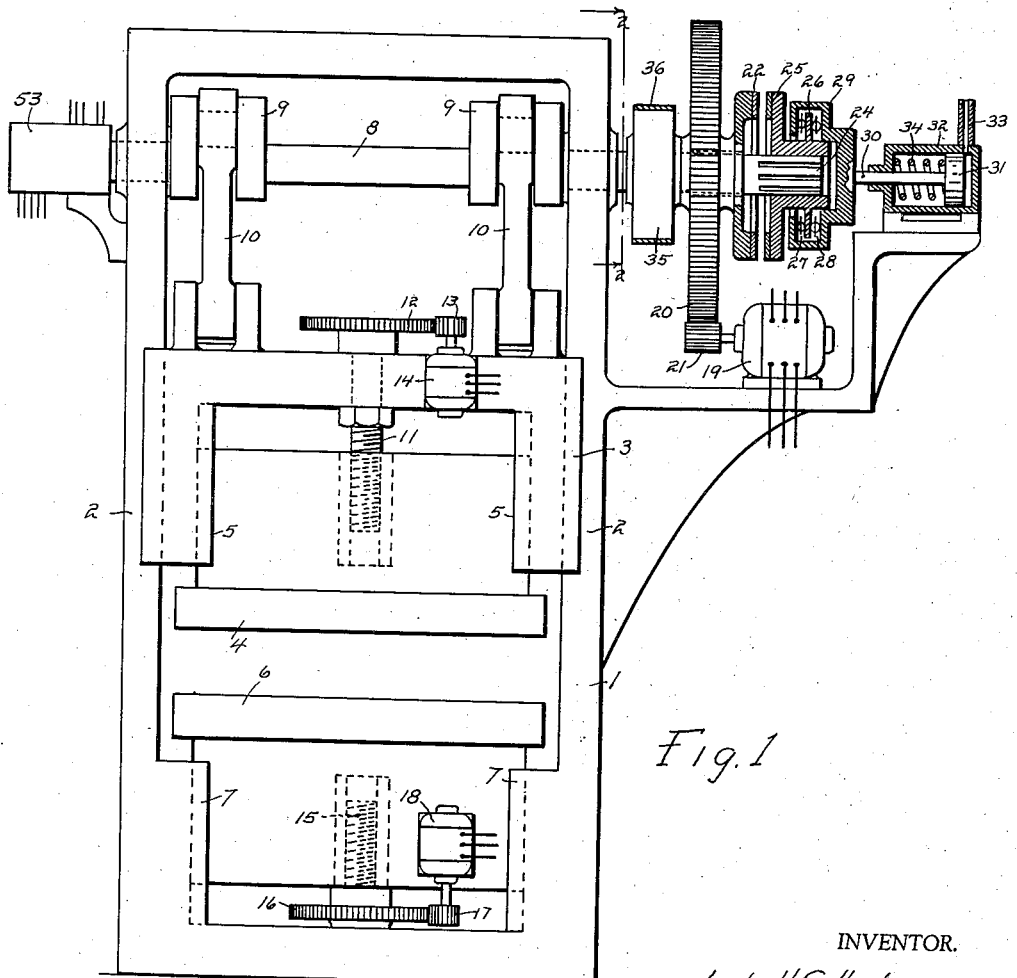
Fig. 1 is a diagrammatic view of a press showing die-heads on upper and lower slides, slide motors for adjustably moving the slides, a main motor for supplying power to operate the press, a pneumatic clutch and a pneumatic brake for starting and stopping the press, and a controller, embodying a part of my invention, operated by the press.

Referring to the drawings, Fig. 1. I have illustrated generally at 1 the main frame of a power-operated press, the view being in simplified, somewhat diagrammatic form, the press comprising sides 2—2 upon which a main head 3 may be vertically reciprocated. Upon the main head 3 is an upper die-head 4 which may slide vertically in ways 5—5 on the main head to adjust its position.

A lower die-head 6 may similarly slide vertically on ways 7—7 on the main frame to adjust its position vertically.

A main shaft 8 is rotatably supported on the frame and has a pair of cranks 9—9, to which are connected at their upper ends connecting-rods 10—10, the lower ends of which are connected to the main head 3, to reciprocate it when the shaft 8 is turned.

To adjust the position of the upper head 4, it has a large screw 11 threaded thereinto, the upper end of which is rotatably mounted in the main head 3 and has a gear 12 connected thereto for turning it, arranged to be rotated by a pinion 13, driven by an upper slide motor 14.

The lower die-head 6 is arranged to be vertically moved to adjust it by a screw 15, which may be rotated by a gear 16 meshed with a pinion 17 on a lower slide motor 18.

The main press motor 19 drives a large gear 20 by means of a pinion 21, the gear 20 being arranged to rotate idly on the shaft 8. The gear 20 has connected thereto an axially stationary clutch element 22.

The shaft 8 is splined at 24 and an axially reciprocable clutch element 25 is mounted on the end of the shaft and is meshed with the splines. When the clutch element 25 is moved to engage the clutch element 22, the large gear 20 is thereby connected to the shaft 8 through the clutch elements and the splines to drive the shaft 8, and the drive ceases when the clutch elements are separated.

To thus operate the clutch element 25, it has a collar 26 thereon and ball bearings 27 and 28 engage the sides of the collar, being retained in a housing 29 whereby the flange 26 may rotate with the clutch element 25 within the housing.

The housing 29 is connected to the piston rod 30 of a piston 31 reciprocable in a cylinder 32 to which fluid pressure may be supplied behind the piston 31 through a conduit 33. A spring 34 in the cylinder 32 normally holds the piston 31 in a rearward position at which the clutch elements are disengaged and upon the application of fluid pressure through the conduit 33, the piston 31 moves forwardly against the tension of the spring 34 and engages the clutch elements 22 and 25.

Figure 2:
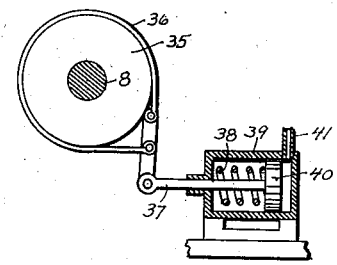
Fig. 2 is a diagrammatic view taken from the plane 2—2 of Fig. 1 further illustrating the brake of Fig. 1.

A brake drum 35 is mounted on the shaft 8 and has a brake band 36 on its periphery which, as shown in Fig. 2, may be operated to tighten the band to effect braking action to stop the shaft 8 by the reciprocation of a piston rod 37 toward the right, as viewed in Fig. 2, by a spring 38 in a cylinder 39. To release the brake, a piston 40 on the rod 37 in the cylinder is reciprocated toward the left by fluid under pressure admitted to the cylinder behind the piston through a conduit 41.

Figure 3:
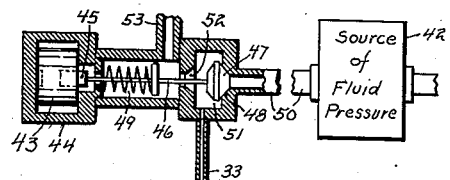
Fig. 3 is a view somewhat diagrammatic illustrating an electrically operated valve for controlling the operation of the pneumatic brake or clutch.

In Fig. 3 is illustrated a magnetic valve by which fluid pressure may be caused to flow from a source of fluid pressure 42 to the conduit 33 to operate the clutch 22—23. An electromagnet 43 enclosed within a magnetic circuit 44, when operated draws into it a plunger 45 connected to a valve stem 46, having on the end thereof a valve 47, normally pressed on a valve seat 48 by a spring 49. When the winding 43 is energized, the plunger 45 and the valve 47 are withdrawn, permitting fluid under pressure from the source 42 to flow by a conduit 50 through the valve seat 48 into a chamber 51 and thence out at the conduit 33.

When the winding 43 is de-energized the spring 49 moves the valve 47 to its seat shutting off the supply of fluid pressure and allowing the pressure in the cylinder 32 to discharge backwardly through the conduit 33 into the chamber 51 and thence out through another valve seat 52 and to atmosphere by way of a conduit 53. The valve seat 52 is closed by the valve 47 when withdrawn by the winding 43 to prevent the escape of fluid pressure from the source directly to atmosphere by way of the conduit 53.

The winding 43 is reproduced in Fig. 4, and, as will now be understood, is the clutch valve winding or magnet.

A device identical with or similar to that in Fig. 3 may be provided to apply fluid pressure from the source 42 to the conduit 41 of the brake, Fig. 2, and will have a winding 54 to operate it, this winding being shown in Fig. 4 adjacent to the winding 43, and is therefore, the brake valve winding or magnet.

From the foregoing it will now be seen that, referring to Figs. 1, 2, 3 and 4, when the clutch magnet 43, is energized this magnet, will cause fluid pressure to be admitted to the cylinder 32, Fig. 1, to operate the clutch 22—25 to start the shaft 8, and move the upper die-head 4 reciprocatively, and when de-energized the clutch 22—25 will be disengaged by the spring 34, Fig. 1; and that when the magnet 54, is energized, it will, by a device similar to that of Fig. 3, cause fluid pressure from the source 42 to release the brake 35—36, Fig. 1, permitting the shaft 8 to be turned and, when de-energized, the spring 38, Fig. 2, will re-set the brake to stop the shaft.

The motor 19, Fig. 1, operates continuously and continuously drives the gear 20 and the clutch element 22.

The main motor 19, may be a squirrel cage induction motor and run always at the same or synchronous speed; but in the arrangement herein shown, in order to have greater flexibility of operation, the motor 19 is a two-speed squirrel cage induction motor, having two sets of primary windings as indicated in a diagrammatic showing in Fig. 6, and is arranged to run at a high synchronous speed when one primary winding is energized and at a low synchronous speed when the other is energized.

Referring to Fig. 6, to start the motor 19 in the forward direction and to accelerate it to low speed, a three-pole switch F, indicating "forward", and a three-pole switch LS, "low speed", are closed, whereupon current flows from three-phase supply mains 55, through the contacts of the switch F and through starting resistors 56—56—56 and thence through the contacts of the switch LS to the motor 19, to accelerate it. The three-pole accelerating switch A, indicating "acceleration", is subsequently closed short-circuiting the resistors 56—56—56, and bringing the motor up to full low speed.

To operate the motor 19 at full high speed, and starting with all of the switches open, the said switch F, is closed and a three-pole switch HS, indicating "high speed", is closed whereupon current flows from the mains 55 through the switch F, resistors 56—56—56 and the switch HS to the other winding of the motor 19; and subsequently the switch A is closed to cut out the starting resistors 56—56—56, bringing the motor up to its full high synchronous speed.

To reverse the motor 19 in the operation of the apparatus to be described, starting with all of the switches open, a three-pole switch R, indicating "reverse", is closed, and the switch LS is closed, whereupon current flows from the mains 55 through the switch R, resistors 56—56—56 and the switch LS to the motor 19, and subsequently the accelerating switch A is closed, short-circuiting the resistors 56 to bring the motor 19 up to low synchronous speed in the reverse direction.

The arrangement of the circuits between the supply mains 55 and the motor 19 controlled by the switches as described is completely illustrated in Fig. 6, and believed to be clear to those skilled in the art without a detailed reference to each of the wires thereof.

The switches R, HS, F, A and LS are electromagnetic switches and have respectively windings for operating them, identified by the reference characters RW, HSW, FW, AW, and LSW.

The power circuits for the motor 19 are described above in connection with Fig. 6, wherein they are shown and the control circuits for the windings of the power switches for the motor 19 will now be described in connection with Fig. 5, wherein the switches R, HS, F, A and LS are reproduced and the windings thereof connected into the control system therefor.

Referring to the control system, Fig. 5, to run the motor 19, of Fig. 6, forward at high speed, a double push-button contactor 57 is closed, and current flows from a supply line 58 through the upper contacts of the push-button 57 and by a wire 59 through the winding HSW of the high-speed switch HS to the other supply line 60, closing the switch HS. Current also flows through the lower contact of the push-button 57 and by a wire 61 through the winding FW of the forward switch F to the line 60, closing the forward switch. As described for Fig. 6, this starts the motor 19 with the resistors 56 in the circuit. A momentary closure of the push-button 57 is sufficient, holding circuits being made for the switches HS and F as follows. When the switch HS closed, it closed an auxiliary switch 62, reproduced separately in Fig. 5, and the current then flowed from the line 58 by a wire 63 through the auxiliary switch 62, and through the winding of the forward switch F, holding it closed; and when the forward switch F closed, it closed an auxiliary switch 64, reproduced separately in Fig. 5, so that current flowed from the line 58, through the wire 63, switch 64, wires 66 and 59 and thence to the winding of the high speed switch HS holding it closed.

The resistors 56—56—56 referred to in Fig. 6, are cut out of the motor circuit to accelerate it to full high speed by the control, Fig. 5, as follows.

When the switch HS closed, it closed an auxiliary switch 67 reproduced separately in Fig. 5, current flowed from the line 58 through the switch 67 to the winding TW of a delayed operation switch T, and thence to the line 60. The switch T may have any known or suitable means to delay or retard its operation, a conventional dash-pot 164 is shown in the diagrammatic representation. The switch T, after a predetermined accelerating time has passed, closed its contacts 65, reproduced separately in Fig. 5, and current flowing through the switch 67 then flowed also through a wire 75 and through the contacts 65 and through the winding of the accelerating switch A to the line 60, closing the switch A and a short-circuiting the resistors 56, as described in connection with Fig. 6.

The motor 19 is now up to full high speed and will continue so to run until it is desired to stop it, and it may be stopped by operating a normally closed push-button contactor 68, Fig. 5, cutting off the supply of control current, whereupon switches HS, F, T, and A open to interrupt the power current to the motor, and also open their auxiliary switches 62, 64 and 65 described above.

The control system of Fig. 5, to operate the switches F, LS, and subsequently A to run the motor 19 at its low synchronous speed will now be described.

For this purpose a double push-button contactor 69, Fig. 5, is momentarily operated. Current then flows from the line 58 through the stop switch 68 and through wire 63 to the upper contact of the push button 69, and thence by wire 61 through the winding of the forward switch F to the line 60, closing the switch F. Current also flows through the lower contact of the push button 69, and by wire 70 through the winding of the low speed switch LS to the line 60, closing the low speed switch. The push-button contactor 69 need be only momentarily closed because of the holding circuits established as follows.

The forward switch F on closing, closes an auxiliary switch 71, which is reproduced separately in Fig. 5, so that current may flow from the wire 63 through the switch 71 and by wires 79 and 70 to hold the low speed switch closed. The low speed switch when it closes, closes an auxiliary switch 72, reproduced separately in Fig. 5, so that current flows from the wire 63 through the switch 72 to the wire 61 and through the winding of the forward switch to hold it closed.

To accomplish acceleration of the motor on low speed, the low speed switch LS upon closing closes an auxiliary switch 73, reproduced separately in the figure, and current then flows from the supply line 58 through a wire 74, switch 73, wires 75 and 76 through the winding of the time switch T to the line 60, causing the switch T, after a time interval, to operate and close contacts 65, reproduced separately in the figure, so that current after flowing through the switch 73 also flows through the contacts 65, and through the winding of the accelerating switch A to line 60, closing the switch A and short-circuiting the motor resistance, causing the motor 19 to run at low synchronous speed.

When the motor is reversed it runs at low synchronous speed, and to operate the switches R and LS and subsequently the accelerating switch A, it is first necessary to close a lock-switch 77 to be referred to. With this switch closed, a double push-button contactor 78 may be momentarily closed and current will flow from the line 58 and by wire 63, through the switch 77 and upper contact of the push-button contactor 78, wire 79 and wire 70, through the winding of the low speed switch LS, closing it. Current flows also through the lower contact of the push-button contactor 78 and by wire 80 to the winding of the reversing switch R and thence to line 60, closing the reversing switch R.

When the reversing switch closes, it closes an auxiliary switch 81 and an auxiliary switch 82, reproduced in Fig. 5, and makes a holding circuit for the low speed switch as follows.

Current flows from the wire 63 through the closed switch 82, and by wires 79 and 70 to the winding of the low speed switch LS. The low speed switch on closing, closes the auxiliary switch 72 and makes a holding circuit for the reversing switch R from wire 63 through the switch 72 and through the auxiliary switch 81 closed by the reversing switch and through the winding of the reversing switch.

The low speed switch by closing the auxiliary switch 73 initiates operation as described above which results in closure of the accelerating switch A after a timed interval.

It will be observed that whether the main motor 19 is running in forward high speed, forward low speed, or reverse low speed, the power thereto may be interrupted by a single push-button contactor 68; and that the reversing control is isolated from the rest of the system, both by the auxiliary switch 81 in the holding circuit for the reversing switch R which must be operated by that switch itself, and by the lock-switch 77, so that unintended operation of the main motor in the reverse direction is guarded against.

Referring again to Fig. 6, the upper slide motor 14, which is preferably a squirrel cage induction motor, may be given power from the line 55 in the direction to move the upper slide 4, of Fig. 1, in the up or in the down direction by switches UU signifying "upper-up" and UD, signifying "upper-down", operated by energizing the windings UUW and UDW; and similarly the lower slide motor 18 may be operated to move the lower slide 6, Fig. 1, up or down by switches LU, signifying "lower-up", and LD, signifying "lower-down", energized by windings LUW and LDW.

These switches and their windings are reproduced in Fig. 5, wherein the windings are connected into the control system.

The control for the upper slide motor 14 comprises two push-button contactors, an up-contactor 84 and a down-contactor 85, both of which, however, are connected in series with a lock-switch 83 to be referred to. When the lock switch 83 is closed, current can flow from the supply line 58 through either the up-contactor 84 or down-contactor 85, to energize and close the corresponding up-switch UU or down-switch UD.

Similarly, for the lower slide motor 18, up and down push-button contactors 86 and 87, in series with a lock switch 88, control energization of the windings of the up-switch LU or down-switch LD, for the lower slide motor.

The lock-switches 77, 83 and 88 are switches which can be operated to be opened or closed only by a key. Any suitable lock-switch of this type may be employed. One such switch is illustrated diagrammatically in Figs. 14 and 15 and comprises a barrel 89 having a switch-arm 90 carrying a contact 91. The barrel rotates on trunnions 92 and 93 rotatably supported in bearings 94—94. A lock 95 locks the barrel to a stationary frame member 96. By inserting a key 97 in the lock 95 and upon turning the key 97, the barrel 89 may be rotated in one direction or the other to engage or disengage the contact 91 with a pair of contacts 98 and 99, which may be connected to the circuit to be controlled.

An actual structure of such a lock-switch constitutes a part of the subject matter of the co-pending application of Theodore W. Barlow, Serial Number 184,863, filed January 13, 1938, for improvements in safety electrol contactors, under which the assignee of the instant application has contractual rights, and reference may be had thereto.

The purpose of providing the lock switches 77, 83 and 88, of Fig. 5, is to prevent unauthorized operation of the main motor in reverse or the slide motors in either direction and to enable the control of these circuits to be placed at a master operating station to be referred to.

In setting up the press of Fig. 1, preparatory to production, the slide motors 14 and 18 may be operated to raise or lower either of the die-heads 4 or 6 by the power system of Fig. 6, under the control of the control system of Fig. 5. In connection with Fig. 4, will be described the control by which "inching" operations of the main motor 19 in the forward or in the reverse direction may be performed for assisting in setting up the press; and means will be described by which when the main motor is in reverse, only "inching" operations of the press may be performed; and by which no operation of the press either "inching" or otherwise, with the main motor running either forward or in reverse, can be performed if the upper slide motor 14 is being operated to lower the upper die-head 4 or the lower slide motor 18 is being operated to raise the lower die-head 6, in order to further protect the press from accidental damage; and means will be described by which no operation of the press either in normal production or "inching" can be effected unless the main motor has been accelerated up to full speed.

Before a description of Fig. 4, however, the controller 53 operated by the press, Fig. 1, and shown in developed form in Fig. 16, and a master controller, Figs. 7 to 10, which make certain circuit changes in Fig. 4, will first be described.

Referring to Fig. 16, the controller comprises eleven stationary contacts, 100 to 110 inclusive, under which and into contact with which move circular contacts, 111 to 121 inclusive, shown in Fig. 16 developed into a plane.

The circular contacts 111, 112 and the circular contacts 113, 114, 115 and the contacts 116, 117 and the contacts 118, 119 and the contacts 120, 121 are connected together in groups respectively, by bridging connections as shown in Fig. 16.

The drum controller rotates the circular contacts continuously as the press shaft 8 rotates; and eight positions 45° apart are shown for reference in Fig. 16, and when the controller is operated by rotation of the shaft 8 of the press 1, in the normal forward direction thereof, the controller contacts 111 to 121 move under the contacts 100 to 110 in the clockwise direction as viewed from the left hand side of Fig. 16.

The stationary contacts 100 to 110 are reproduced in the control system of Fig. 4 and the movable contacts 111 to 121 are reproduced therein adjacent to the stationary contacts, which they control.

The master drum controller, Figs. 7 to 11 inclusive, comprises a drum 122 having thereon contacts 123 to 128 inclusive, which upon rotation of the drum 122, move into and out of engagement with stationary contacts 129 to 139 inclusive. There are four operative positions of the drum 122, illustrated respectively in Figs. 7 to 10 inclusive. A handle 140 is provided by means of which the drum 122 may be rotated in either direction. A controller housing 189, by which the drum may be enclosed, as shown in Fig. 7, has a dial 141 thereon bearing legends to which a finger 142 on the handle 140 points, to indicate the positions of the drum. The legends are "Long", "Short", "Inch" and "Continuous", and they indicate the character of the operation of the press when the drum is in the corresponding positions. Figs. 7 to 10 illustrate respectively the condition of the contacts on the drum when in the "Long", "Short", "Inch" and "Continuous" positions respectively.

The stationary contacts 129 to 139 and the stationary contacts 123 to 128 are reproduced in Fig. 4, and in that figure are shown in the "Long" position corresponding to Fig. 7.

Referring now to Fig. 4, it will be assumed that the press of Fig. 1 is at the top of its stroke and that the drum controller 53, Figs. 1 and 16, is in the zero degree position, and that the master controller is in the "Long" position, Fig. 7.

Four operators are required to effect an operation of the press, although any other number may be arranged for. When four operators are employed, four pairs of push-button control contactors, 143 to 146 inclusive, are provided and each operator must operate both push-buttons of the pair to occupy both of his hands in order to start the press and must hold them operated for a relatively "long" period of time to keep the press in operation on its down stroke until the upper die-head 4, Fig. 1, has moved so far down that there is no liability that the operators can get their hands or arms or other part of their bodies in its path. The push-buttons may then, but not before, be released, and the press will continue its stroke and return to its upper position where it will stop even if the operators should maintain the push-button contactors operated; and before the press can make another down stroke, all of the push-buttons must be fully released and then again operated, thus insuring that the press cannot unintentionally repeat by improper operation of the push-button contactors.

In Fig. 4, control power is supplied from the said mains 55 and the voltage thereof will preferably be reduced by a transformer TR, the secondary 147 thereof supplying current to the supply wires 58 and 60. When the main line voltage is applied to the mains 55, current will flow from the supply wire 58 to auxiliary switches 148, 149 and 150 and through a number of stop push-button type contactors, 151 to 154 inclusive, and thence by wires 155 and 156 flows to contacts 138 and 139, which as will be seen in Fig. 7, are closed on the master controller, and thence through an auxiliary switch 157 to a wire 158, thence through the upper contacts of the operators' push-button contactors 143 and 144, through the winding 159 of a "non-repeat" magnetic contactor NR, and thence through the upper contacts of the operator's push-button contactors 145 and 146 to a wire 160, and thence by the supply wire 60 back to the other side of the transformer secondary 147.

The non-repeat contactor NR referred to, is a four-pole contactor and when it is operated by the winding 159 which is now energized, it closes four switches NR1, NR2, NR3, NR4. These switches are reproduced elsewhere in the diagram, Fig. 4. The switches NR1 and NR2 make a holding circuit for the winding 159, by closing a circuit from the wire 158 through the controller contacts 100 and 101 which are, in this position of the press, connected together on the controller, Fig. 16, through the switch NR1 to one side of the winding 159 and from the other side of the winding through the switch NR2 and through the contacts 110 and 109, which are closed on the drum-controller, Fig. 16, to the wire 160. The operators' push-buttons may be operated, opening the upper contacts thereof and closing the lower contacts, and the non-repeat switch NR remaining closed by its holding circuit, holding the switches NR3 and NR4 closed, current may flow from the said wire 158 by wire 162, through the lower contacts of the operators' push-button contactors 143 and 144, through the switch NR3, thence through the winding 163 of a magnetic relay R, thence through the switch NR4, and through the lower contacts of the operators' contactors 145 and 146 to the supply line 60.

The relay R will now close and, being a four-pole relay, closes four switches R1, R2, R3, R4, reproduced elsewhere in the diagram. With these switches closed, current now flows from the wire 155 by a wire 165 through the switch R1 and by a wire 166 through the switch R2, and through a wire 167 and thence by a wire 168 and a wire 169 through the winding 170 of a valve relay V, and thence by a wire 172 through the switch R4 to the line 60.

The valve relay V is a four-pole relay and when it closes closes four switches V1, V2, V3, and V4, reproduced elsewhere in the diagram. Current then flows from the power mains 55 directly by a wire 174, through the switch V1, thence through the brake valve winding 54, described in connection with Figs. 1, 2 and 3, and thence through the switch V2 and a wire 175 back to the power source. This operates the brake 35—36, Fig. 1, to release it as described above.

When current flowed as above described from the wire 167 to the winding 170 and so on to operate the relay V, current also flowed from the wire 167 through the switch R3 and by a wire 176 to the winding 177 of a delayed operation or timed contactor T, and thence by wire 179 to the wire 172 and through the switch R4 to the line 60.

The contactor T may be of any known or suitable construction having means to delay or retard its operation. A conventional dash-pot retarder 161 is shown in the diagrammatic illustration. The contactor T is a two-pole contactor and after an interval of time closes switches T1 and T2, reproduced elsewhere in the diagram. As just described, the press brake was released at once on closure of the valve relay V; and now after a time interval determined by the setting of the contactor T, current flows from the wire 174 through the switch V1, and by a wire 180 through the clutch valve winding 43 and thence through the switch T1 and switch V2 back to the source, by wire 175 operating the clutch of the press as described above.

It is assumed that, at this time, the die-heads 4 and 6 have been suitably adjusted and positioned and that the motors 14 and 18 now remain at rest, and that the motor 19 is running in the forward direction. The clutch, now being operated, the press starts the beginning of a cycle, rotating the shaft 8, moving the upper die-head downwardly and turning the controller 53 by the shaft 8. It will be noted that no holding circuit has yet been made for the relay R, and therefore it must be held closed by the operators' push-buttons 143 to 146. It has also been stated that the master controller of Figs. 7 to 11 is in the "Long" position, which means that the operators will have to hold the contactors 143 to 146 closed for a relatively long time, as will now be explained.

Amost immediately after the press starts, the drum controller, Fig. 16, connects the contacts 105—106 making, as shown in Fig. 4, a holding circuit for the delayed operation contactor T independently of the relay R.

A little later in the stroke of the press, the drum controller connects contacts 107 and 108 which, as shown in Fig. 4, effects holding of the relay V closed independently of the relay R.

When the press has moved the upper die-head down to a point at which it is considered safe for the operators, the drum-controller, Fig. 16, connected the contacts 102 and 104. As illustrated in Fig. 16, this is at approximately 112° of the rotation of the shaft 8, but may be made as much greater as desired by shortening the lower end of the contact 115.

When the contacts 102 and 104 are thus connected, the remaining switches R1 and R2 of the relay R, are bridged, the current flowing from the wire 165, through the connected contacts 102 and 104, through the connected contacts 135 and 136 on the master controller and thence through the switch V4 to the wire 167, thus rendering the relay R ineffective, and transferring the holding of the switches T and V to the contacts 102 and 104.

The operators may now remove their hands from their push-button contactors 143 to 146, and they will return to their former positions, opening the lower contacts and closing the upper contacts, being biased to this position by springs 199 to be referred to. When the push buttons are released the relay R opens, opening the switches R1, R2, R3, R4, but without effect, the switches V and T being held closed as described, through the controller contacts 102 and 104 and the switch V4, which is a part of the relay V, so that the brake is held disengaged and the clutch engaged.

The press, now continuing to operate on the down stroke, performs its operation on the work, passing through the 180° position on the drum controller, Fig. 16, and starts back up on the return stroke. During the entire stroke thus far, the contactor NR remains closed as will be understood, through the agency of the connected contacts 100, 101, and 109, 110, which are held closed on the drum-controller.

After the press on its return stroke has turned the shaft 8 a total of approximately 295°, the drum controller contacts 105 and 106, Fig. 16 and Fig. 4, are disconnected. This, as shown in Fig. 4, de-energizes the winding 117 of the contactor T (the switch R3 being open,) and the contactor T opens the switch T1, which de-energizes the clutch valve winding 43 and the clutch opens. At about the same time, the drum controller disconnects the contacts 109, 110, and 100, 101, which opens the holding circuit to the winding 159 of the contactor NR causing it to open its switches NR1 to NR4 so that even if the push-buttons have been held in downward position the winding 163 of the relay R will be de-energized by the switches NR3 and NR4, thus restoring the system. As a further precaution, when the contactor T opened, it opened its switch T2 in the circuit of the winding 163.

A little before 360°, the drum-controller disconnects the contacts 107 and 108 thereby breaking the holding circuit to the relay V, which, by its switches V1 and V2 de-energizes the brake valve winding 54, and causes the brake to set to stop the press. Finally at 360°, the contacts 100, 101, and the contacts 109, 110, are again connected by the drum-controller as in the initial condition at the start of the stroke, and the press is ready for another operation.

Before another operation may be effected, however, the operators, as will now be clear, must allow their push-buttons 143 to 146 to move to the upper position to again cause the contactor NR to close, so that it is impossible for the press to repeat, even if the operators should negligently hold the push-buttons closed.

In the foregoing described operation, the operators are required to hold their control-contactors 143 to 146 closed for a pre-determined "long" time for the sake of safety, determined by the length of the lower end of the movable contact 115, Fig. 16.

If, however, the construction of the press and the nature of the work will permit, or if for any other reason it be desirable, this holding period may be shortened. This is accomplished by turning the master-drum controller, Figs. 7 to 11, to the "Short" position of Fig. 8, which as shown in that figure, disconnects the contacts 135 and 136 which were connected in the "Long" position of the controller, and connects the contacts 134 and 135.

The drum-controller, Fig. 16, now need not turn far enough to engage the contact 104, Fig. 4, but only far enough to engage the contact 103, which is, as illustrated in Fig. 4, a movement of approximately 45°, this being due to the fact that the drum-contact 114 is longer than the said contact 115, therefore, effecting the engagement in a shorter period of time. The holding period is therefore shortened.

The said master controller contacts 134 and 135 are reproduced in Fig. 4 as well as the contact 103. The operation is otherwise the same as for the "Long" control.

If because of the character of the work being handled, and the operations of moving the work to the machine and the finished work away from it, or if for any reason it be deemed safe for the press to run continuously after once being started, the master-controller will be moved to the "Continuous" position of Fig. 10, whereby as shown, contacts 129 and 130 will be connected together, and contacts 137 and 138 will be connected together. These contacts are reproduced in Fig. 4, and the operation is then as follows.

When the contactor NR and relay R have been closed, closing switches R1, R2, R3, R4 and, by the circuits described above, the contactor T and relay V have operated, the contactor T closes its switch T2 and the relay V closes its switch V3, which makes a holding circuit for the winding 163 of the relay R through the engaged master controller contacts 129, 130 and 137, 138. This circuit is directly across the supply mains and is independent of the drum-controller of Fig. 16, after it is once established at the top of the first stroke. Therefore, the relay V will maintain the brake disengaged and the contactor T will maintain the clutch engaged continuously and the press will continuously operate.

The operation of "inching" the press forward or in reverse during setting-up will now be described.

Assuming that the main motor 19 has been started in the forward direction, the master-controller is now moved to the "Inch" position of Fig. 9, which connects contacts 130 and 131 and contacts 132 and 133, which are reproduced in Fig. 4. At I is illustrated a four-pole "inching" contactor, preferably of the push-button type, controlling four switches 182 to 185. By momentarily closing this contactor, the brake will be released and the clutch will be engaged, and upon releasing the contactor, which is of the type biased to open position, the clutch will be released and the brake will be set. Thus short "inching" movements of the upper head of the press may be effected.

Upon closing the contactor I, current flows from the wire 165 through the connected contacts 133 and 132 to the switch 185 and thence through the winding 177 of the contactor T, and by wires 179 and 172, and a wire 186 to the switch 183, thence through the contactor I to the switch 182 and thence by a wire 187 to and through the engaged contacts 131 and 130 to the other side of the line, 60, thus operating the delayed operation contactor T. Current also flows through the connected contacts 133, 132 to the switch 184 and thence by the wire 169 through the winding 170 of the relay V and by wires 172 and 186 and so on again to the line 60, operating the relay V. As described above the relay V, through its switches V1 and V2 dis-engages the brake, and the delayed operation contactor T through its switch T1 engages the clutch.

It is one of the advantages of my invention that when the press is being "inched" it cannot be otherwise operated. It will be observed that when the master-controller, as shown in Fig. 9, is in the "Inch" position, the contact 139 is open, but that in all other positions of the controller, Figs. 7, 8 and 10, this contact is connected to the contact 133 either directly, as in Figs. 8 and 10 or indirectly, as in Fig. 7, through the contact 138 which is connected to the contact 133 by a bridging wire 188, but that in the "Inch" position, Fig. 9, the contact 139 is open. This, as will be apparent from Fig. 4, will disconnect the system including the operators' push-buttons 143 to 146 from the supply mains so that in their upper positions they are ineffective to close the contactor NR, which must be closed before the relay R can be closed, and therefore, are ineffective to operate the press.

It is another advantage of my invention that the press cannot be operated either in normal production or to "inch", unless the main motor 19 is substantially up to speed. This always insures uniform operation, and prevents putting load on the motor at low speed and consequent blowing of fuses and disabling of the press, and is accomplished as follows.

Referring to the switch A, Figs. 5 and 6, an auxiliary switch 148 is operated thereby. The switch A, as described hereinbefore, is the accelerating switch, and when it operates it short-circuits the resistance 56 in the starting circuit of the main motor 19, thus bringing the motor 19 up to speed. This auxiliary switch 148 is reproduced in Fig. 4, in the line of the main control current. Therefore, unless this auxiliary switch 148 is closed as the result of accelerating the main motor 19 up to full speed, no operation of the control system can be accomplished.

It is another advantage of my invention that only "inching" operations and not press driving operations can be performed when the main motor 19 is running in the reverse direction.

As shown in Figs. 5 and 6, the reversing switch R has thereon an auxiliary switch 157, which is reproduced in Fig. 4, and referred to above. Unless this switch is closed the control circuit through the operators' control-contactors 143 to 146 is open and they are ineffective to cause operation of the press clutch and brake. When the reversing switch is operated and the main motor 19 is running in the reverse direction, its auxiliary switch 157 will, of course, be open and therefore, only "inching" operations can be performed.

It is another advantage of my invention that the press cannot be operated while the lower slide motor 18 is moving the lower head 6 upwardly, or the upper slide motor 14 is moving the upper head 4 downwardly. Operation of the press at such times might result in damage to the press because the die-heads and dies thereof, may at such time, be too close together. This protection is accomplished in the following manner.

The switch UD, which must be closed to move the upper die-head downwardly by the upper slide motor, as described hereinbefore, when it closes, opens an auxiliary switch 149, as shown in Figs. 5 and 6; and the switch LU, as shown in Figs. 5 and 6, which must be closed when the lower slide motor is moving the lower head upwardly, when it closes opens an auxiliary switch 150. These switches 149 and 150 are reproduced in Fig. 4, in the direct line of the control current. Both of these switches must be closed before the control system for the brake and clutch can be operated.

At any time during the operation of the press it may be stopped by any one of the operators by means of four stop-push-button contactors, (when there are four operators) 151 to 154 inclusive, shown in Fig. 4, in the line of the main control.

An additional stop-push-button contactor is shown in Fig. 5, at 68, for the main motor 19.

In an actual installation, the operators' contactors 143 to 146 will be disposed in pairs, as indicated, and adjacent to each pair will be one of the stop-push-buttons 151 to 154, making three buttons for each of the four operators. This is all of the control which is left to the manipulation of the machine operators themselves. The rest of the control is preferably disposed at a master station. This will include the master-controller of Figs. 7 to 11, and, referring to Fig. 5, the lock switches 77, 83, and 88, the stop switch 68, the main motor starting switches 57 and 69, and the main motor reversing switch 78, and the up and down slide motor switches 84, 85, 86, 87. The purpose of thus disposing the master-controls at a master station is to prevent their unauthorized use. It is to this end that the switches 77, 83 and 88 are made operable only by a lock and key. For a like purpose, the master-controller, Figs. 7 to 11, may be locked in its set position. Any suitable lock arrangement may be provided for this purpose. One arrangement is shown in Fig. 11, wherein a strap 190, hinged as at 191 to the housing 189, extends over and covers the handle 140 and is locked to the housing by a padlock 192, preventing moving of the controller by the handle 140 except when the padlock is unlocked and the strap 190 is rocked downwardly to give access to the handle.

In the preferred embodiment of my invention, for the operators' control contactors, 142 to 146, I prefer to provide a contactor-mechanism, such as that illustrated diagrammatically in Figs. 12 and 13. Such a contactor constitutes part of the subject matter of the co-pending application of Theodore W. Barlow above referred to, and reference may be had thereto for a more complete description of the actual structure. In the diagrammatic showing thereof of Figs. 12 and 13, the "upper" contacts are shown at 193, and the "lower" contacts at 194. An arm 195 pivoted on a stationary pivot at 196 has contacts 197 and 198 on one end to engage and bridge the said lower end upper contacts, and is held normally in engagement with the upper contacts 193 by a spring 199. Above the pivot 196 the arm has a roller 200 thereon. An arm 201 pivoted at 202 engages the roller 200 and has thereon a handle or push-button 203.

Upon pushing downwardly on the push-button 203, the arm 201 will rock the arm 195 to disengage the upper contacts 193 and engage the lower contacts 194, to perform the operation described for the contactors 143 to 146, of Fig. 4, the spring 199 returning the arm 195 to engage the contacts 193 when the push-button 203 is released.

In some cases it is desirable to prevent any operation by the operators' contactors 143 to 146, Fig. 4. To accomplish this, when a contactor such as that of Figs. 12 and 13 is employed, a barrel 204 is provided having trunnions 205 and 206, rotating in supporting bearings 207—207, the trunnion 206 being connected to the cylinder 208 of a lock 209, which can be turned only by a key 210 when inserted in the lock, the cylinder 208 otherwise being locked to a stationary frame 211. Upon the barrel 204 is an abutment 212. By inserting the key 210 and turning the lock, the abutment 212 is brought around onto the upper side of the barrel 204 and is disposed under a hook 213 on the arm 201, Fig. 12, and prevents the arm from being moved downward by the push-button 203 to operate the contacts.

The contactor would be locked against operation in this manner when all of the operators' contactors were similarly locked open to prevent operation thereof.

In some cases it may be desired to dispense with one or more of the operators. In such cases, the push-button 203 is depressed to engage contacts 198 and the key 210 is inserted in the lock and the barrel 204 turned until a hook 214 on the barrel is rotated around to a position in which it hooks over the hook 213 on the arm 201. This holds the arm 201 down. By the same rotary movement, a contact 215 on an arm 216 on the barrel is rotated into position to connect a pair of contacts 217 which are connected in parallel with the contacts 193. Thus both the "upper" and the "lower" contacts of the contactor are connected together so that the one or more contactors locked in this position are merely short-circuited and the other contactors may be operated in the regular manner. Thus with the contactors arranged as in Figs. 12 and 13, operation of the press can be prevented by locking any one or all of them in open position; or they can all be locked in operable position, in which they must all be operated to operate the press; or any one or more of them can be dispensed with by locking them in operated position which makes the remaining contactors effective, and requires that they must all be operated.

Obviously the locking of the contactor of Figs. 12 and 13, as well as that of Figs. 14 and 15 above referred to, may be within the province of the master-operator in control of the master station.

It is another advantage of my invention that accidental "grounds" which may occur or develop cannot effect accidental starting or continuous running of the press, thereby endangering the operators or the press.

If only one set of operators' control-contactors such as 143 and 144 were provided and the contactors 145 and 146 were omitted, it would be the same as having permanently the connection 218, shown in dotted lines, bridging the contactors 145 and 146. With such arrangement a ground, indicated at 219 might develop at the other side of the winding 159 of the contactor NR. If, now, subsequently, a ground 220 should develop in the line 58 or in the corresponding side of the secondary 147 of the transformer T, current could immediately flow from the other side of the transformer secondary through the line 60, through the dotted line connection, 218, and through the winding 159 to the ground 219 and the system would then function to accidentally start the press.

Again, if instead of providing two pairs of controller-contacts 111, 112, and 120, 121, only one pair, say the controller-contacts 111, 112 were employed, the effect would be the same as if the contacts 109, 110 were permanently connected by the dotted line connection 221. In such case, if there were a ground 219 at one side of the winding 159 and a line ground 220 subsequently developed, the press, after it had been once started and returned to the top of its stroke, would repeat and continue to run because current could flow from the ground 220 to the ground 219, thence to the winding 159 and the switch NR2 which would be closed, through the dotted line connection 221 to the line 60, holding the switch NR closed.

Again it will be observed that the lower contacts of the operators' contactors 143 to 146 are disposed in two groups, one on each side of the winding 163, and switches NR3 and NR4 are disposed on both sides of the winding. If such contacts and switches were disposed only on one side of the winding 163, the arrangement would be the same as if a permanent dotted line connection 222 were provided. In such a case if there were a ground 223 on one side of the winding 163, and a line ground 220 should subsequently develop, current would flow from the ground 220 to the ground 223, thence through the winding 163 and dotted line connection 222 to the other side of the line, closing the switch R and holding it permanently closed, whereupon the press would unexpectedly start and continuously run.

By arranging the parts of the control system as shown in Fig. 4 in a solid line, and with contacts on both sides of the windings 159 and 163, and two sets of controller contacts to open the control circuit at the top of the press stroke, one on each side of the winding 159, and therefore, on each side of the winding 163, there is no place in the system where the occurrence of an accidental ground can cause the machine to unexpectedly start or to repeat its cycle unexpectedly. Any other combination of grounds which might develop, and which can conceivably effect energization of the windings 159 or 163, will provide a short-circuit connection which would blow a fuse, such as are commonly employed but not shown. Thus the operators are at all times protected from accidental starting or accidental repeating of the cycle of the press.

I claim:—

1. In an electric control system for a machine tool or the like comprising a driven element, a drive for driving the driven element including a power source and a clutch, an electric control including a source of electric current actuatable to effect operation of the clutch and communication of power from the power source through the clutch to the driven element, normally restored operator's contactor means arranged to effect, when operated, actuation of the control by current from the current source, an electro-magnetic contactor having contacts for effecting, when operated, actuation of the control jointly with the operator's contactor means, the electro-magnetic contactor being normally maintained operated by a winding connected with the current source and energized through the said contactor means when in restored condition, a holding circuit for the winding of the electro-magnetic contactor to maintain it operated after operation of the contactor means, and a controller operated upon movement of the driven element and having contacts opening the holding circuit when the driven element has been moved to a pre-selected position.

2. In an electric control system for a machine tool or the like having a driven element, a drive for driving the driven element including a power source and a clutch, an electric controller including a source of electric current actuatable to effect operation of the clutch and communication of power from the source through the clutch to the machine tool to drive the driven element, operator's contactor means comprising normally closed and normally open contacts, the normally open contacts when closed by operation of the contactor means arranged to effect actuation of the control by current from the current source to effect starting of the driven element, a magnetic contactor having contacts in series with the normally open contacts of the operator's contactor means and having an energizing winding normally connected to the current source through the normally closed contacts of the operator's contactor means and being normally in operated condition, a holding circuit for the winding bridging the normally closed contacts, a controller operated upon movement of the driven element and having contacts opening the holding circuit when the driven element is moved to a pre-selected position.

3. In an electric control system for a machine tool or the like having a driven element, a pair of electric current supply mains, a source of power and a clutch to drive the driven element, an electro-magnetic relay, a control for effecting operation of the clutch and communication of power from the power source through the clutch to the driven element actuatable upon operation of the relay by current from the supply mains, a magnetic contactor, a plurality of operators' contactors having each normally open contacts and normally closed contacts, the normally closed contacts being disposed in sets on each side of the winding of the magnetic contactor and in series therewith between the supply mains, and the normally open contacts being disposed in sets on each side of the winding of the relay and in series therewith across the supply mains, the magnetic contactor having contacts in series with each set of normally open contacts, a holding circuit for the winding of the magnetic contactor bridging both sets of normally closed contacts, and a controller operated upon movement of the machine tool driven element to open the holding circuit when the driven element is moved to a pre-selected position.

4. In an electric control system for a machine tool or the like, a source of electric current, an electric motor for driving the tool, an accelerator for the motor comprising resistance and contacts to connect the motor to the source through the resistance and a magnetic accelerating switch operable to short-circuit the resistance, an auxiliary switch arranged to be closed upon operation of the accelerating switch, a brake to stop the machine tool and a clutch to communicate power from the motor to the machine tool to drive it, an electric control to release the brake and set the clutch comprising a control actuating circuit connected to the current source, the auxiliary switch being arranged to normally maintain the actuating circuit open and to close it upon closing of the magnetic accelerating switch.

5. In an electric control system for a machine tool or the like comprising a driven element, a source of electric current, an electric motor for driving the driven element, means for connecting the motor to the current source to accelerate it up to substantially full speed, comprising an electromagnetic contactor, a normally open auxiliary switch arranged to be closed upon operation of the contactor upon acceleration of the motor, a clutch operable to communicate power from the motor to the driven element to drive it, a brake to stop movement of the movable element, and an inching control for effecting momentary setting of the clutch and releasing of the brake to inchingly drive the driven element, comprising an inching-control-actuating electric circuit, an inching contactor for momentarily effecting connection of the control-actuating circuit to the current source, the auxiliary switch controlling the control-actuating circuit and preventing actuation of the clutch and brake thereby except when the auxiliary switch has been closed by operation of the electromagnetic contactor and the motor has been accelerated.

6. In an electric control system for a machine tool or the like having a driven element, a source of electric current, an electric motor for driving the driven element, means for connecting the motor to the current source to drive it in the forward direction, means for connecting the motor to the source to drive it in the reverse direction comprising an electro-magnetic contactor, a normally closed auxiliary switch opened upon operation of the contactor to reverse the motor, a clutch to communicate power from the motor to the driven element, a brake for stopping movement of the driven element, an electric control for effecting release of the brake and setting of the clutch comprising a first control-actuating circuit, a working-contactor operable to effect connection of the first control-actuating circuit to the current source to effect working-drive of the driven element, an inching control for effecting momentary release of the brake and setting of the clutch to inchingly drive the driven element comprising a second actuating electric circuit, an inching-contactor for momentarily effecting connection of the second actuating circuit to the current source to effect inching-drive of the driven element, the auxiliary switch controlling the first actuating circuit to open it upon reverse driving of the motor whereby inching-drive and not work-drive of the driven element can be effected when the motor is running in reverse.

7. In an electric control system for power driven machine tools or the like, a source of electric current, a source of power and a clutch for operating the tool, an electric control for effecting operation of the clutch and application of power from the power source through the clutch to the tool and for interrupting the same, a control actuating electric circuit, a plurality of operators' contactor mechanisms comprising each normally closed and normally open contacts, the normally open contacts of the said mechanisms being arranged in series relation, and, when closed by operation of all of the mechanisms, jointly connecting the actuating circuit to the current source, control means including the said normally closed contacts and a circuit connected to the current source thereby, controlling energization of the control actuating electric circuit, one or more of the operator's contactor mechanisms comprising a movable element having means in a first position thereof to prevent operation of the contactor mechanism, and having latch means in a second position of the movable element to latch the contactor mechanism in operated condition to maintain the normally open contacts closed, a local circuit for the normally closed contacts, and auxiliary contact means arranged to be operated manually to close the local circuit after movement of the movable element to the said second position.

8. The system described in claim 7 and in which a key-operated lock is provided for locking the movable element in each said position.

9. In an electric control system for a machine tool or the like having a cyclically driven element, a source of power and a clutch to drive the driven element, a source of electric current, manually operable normally restored contactor means having normally open and normally closed contacts, a first electrically actuatable control connected to the current source for energization thereby for effecting operation of the clutch and communication of power from the power source through the clutch to the driven element and actuatable upon operation of the manually operable contactor means to close the normally open contacts, a second electrically actuatable control connected to the current source for energization thereby for preventing, when unactuated, operation of the clutch by the first control and actuatable to permit operation of the clutch by the first control upon restoring of the manually operable contactor means to close the normally closed contacts, and a controller operable by the driven element to maintain the second control actuated independently of the operable contactor means after initial actuation thereof by the operable contactor means, throughout a predetermined portion of a single cycle of movement only of the driven element.

10. In an electric control system for a machine tool or the like having a driven element, a source of power and a clutch to drive the driven element, a source of electric current, a plurality of manually operable normally restored contactors each having normally open and normally closed contacts, a first electrically actuatable control connected to the current source for energization thereby to effect operation of the clutch and communication of power from the power source through the clutch to the driven element and actuatable upon operation of all of the manually operable contactors to close their normally open contacts, a second electrically actuatable control connected to the current source for energization thereby for preventing, when unactuated, operation of the clutch by the first control and actuatable to permit operation of the clutch by the first control upon restoring of all of the manually operable contactors to close their normally closed contacts, operable means to maintain one or more selected manually operable contactors in operated condition with the normally open contacts closed and means associated with the selected contactors to then electrically connect the normally closed contacts thereof.

11. In an electric control system for a machine tool or the like having a cyclically driven element, a source of power and a clutch to drive the driven element, a source of electric current, a plurality of manually operable normally restored contactors, each having normally open and normally closed contacts, a first electrically actuatable control connected to the current source for energization thereby for effecting operation of the clutch and communication of power from the power source through the clutch to the driven element and actuatable upon operation of all of the manually operable contactors to close the normally open contacts thereof, a second electrically actuatable control connected to the current source for energization thereby for preventing, when unactuated, operation of the clutch by the first control and actuatable to permit operation of the clutch by the first control upon restoring of all of the manually operable contactors to close their normally closed contacts, a controller operable by the driven element to maintain the second control actuated independently of the operable contactors after initial actuation thereof by the operable contactors, throughout a predetermined portion of a single cycle of movement only of the driven element, operable means to maintain one or more selected manually operable contactors in operated condition with the normally open contacts closed, and means associated with the selected contactors to then electrically connect the normally closed contacts thereof.

12. In an electric control system for a machine tool or the like having a cyclically driven element, a source of power and a clutch to drive the driven element, a source of electric current, manually operable normally restored contactor means, a first electrically actuatable control connected to the current source for energization thereby for effecting operation of the clutch and communication of power from the power source through the clutch to the driven element and actuatable upon operation of the manually operable contactor means, a second electrically actuatable control connected to the current source for energization thereby for preventing operation of the clutch by the first control and actuatable to permit operation of the clutch by the first control upon restoring of the manually operable contactor means and a controller operable by the driven element to maintain the second control actuated independently of the operable contactor means after initial actuation thereof by the operable contactor means, throughout a predetermined portion of a single cycle of movement only of the driven element.

13. In an electric control system for power driven machine tools or the like, a source of electric current, a source of power and a clutch for operating the tool, an electric control for effecting operation of the clutch and application of power from the power source through the clutch to the tool and for interrupting the same, including a control-actuating electric circuit, a plurality of operator's contactor mechanisms, comprising each normally closed and normally open contacts, control means including the said normally closed contacts and a circuit connected to the current source controlling energization of the control-actuating electric circuit, the normally open contacts of the said mechanisms being arranged in series relation, and, when closed by operation of all of the mechanisms, jointly connecting the actuating circuit to the current source, one or more of the operator's contactor mechanisms comprising means operable to hold the contactor in operated condition to maintain the normally open contacts closed, a local circuit for the normally closed contacts and auxiliary contacts arranged to be manually moved to close the local circuit when the contactor is held in operated condition.

14. In an electric control system for power driven machine tools or the like, a source of electric current, a source of power and a clutch for operating the tool, an electric control for effecting operation of the clutch and application of power from the power source through the clutch to the tool and for interrupting the same, including a control-actuating electric circuit, a plurality of operator's contactor mechanisms, comprising each normally closed and normally open contacts, control means including the said normally closed contacts and a circuit connected to the current source controlling energization of the control-actuating electric circuit, the normally open contacts of the said mechanism being arranged in series relation, and, when closed by operation of all of the mechanisms, jointly connecting the actuating circuit to the current source, one or more of the operator's contactor mechanisms comprising a movable element, latch means to latch the movable element in operated condition to maintain the normally open contacts closed, a local circuit for the normally closed contacts, and auxiliary contacts arranged to be manually moved to close the local circuit after movement of the movable element to operated condition.

15. The system described in claim 14 and in which a key-operated lock is provided for locking the contacts in operated condition.

16. The system described in claim 14 and in which a key-operated lock is provided for locking the movable element in operated condition.

17. In an electric control system for a machine tool or the like having a cyclically driven element, a source of power and a clutch to drive the driven element, a source of electric current, a plurality of manually operable normally restored operators' contactors disposed to be operable by a plurality of operators, electrically actuatable control means comprising means arranged to be connected to the current source to be actuated thereby only when all of the operators' contactors have been operated, and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined portion of a cycle and to effect interruption of the power communication after the completion of the cycle, the control means comprising means to prevent the initiation of a succeeding cycle by the contactors if they are maintained operated to the end of the cycle, operable means for optionally maintaining a selected contactor in operated condition to eliminate the operator thereof, and the control means comprising means to render the selected maintained contactor ineffective to prevent the initiation of a succeeding cycle by another operation of the other contactors if they are restored before the completion of the cycle.

18. In an electric control system for a machine tool or the like having a cyclically driven element, a source of power and a clutch to drive the driven element, a source of electric current, a plurality of manually operable normally restored operators' contactors disposed to be operable by a plurality of operators, electrically actuatable means arranged to be connected to the current source to be actuated thereby only when all of the operators' contactors have been operated, and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined portion of a cycle and to effect interruption of the power communication after the completion of the cycle, means to prevent the initiation of a succeeding cycle by the contactors if they are maintained operated to the end of the cycle, operable means for optionally maintaining a selected contactor in operated condition to eliminate the operator thereof, and means to render the selected maintained contactor ineffective to prevent the initiation of a succeeding cycle by another operation of the other contactors if they are restored before the completion of the cycle.

19. In an electric control system for a machine tool or the like having a cyclically driven element, a source of power and a clutch to drive the driven element, a source of electric current, a plurality of manually operable normally restored operators' contactors disposed to be operated by a plurality of operators, electrically actuatable control means comprising means arranged to be connected to the current source to be actuated thereby only when all of the operators' contactors have been operated and when actuated effecting operation of the clutch and communication of power from the power source through the clutch to the driven element to initiate a cycle of movement thereof, controller means operated by the machine to effect maintaining of the communication of power, thereby permitting the contactors to be restored after the driven element has made a predetermined part of a cycle and to effect interruption of the power communication at the end of the cycle of movement, the control means comprising safety means controlled by the contactors and actuated by the controller means at the end of the cycle and effective to prevent the initiation of a succeeding cycle by the contactors if they are maintained operated until the end of the cycle and rendered ineffective if the contactors are restored before the completion of the cycle, operable means for optionally maintaining a selected contactor in operated condition to eliminate the operator thereof, and the control means comprising means to cause the selected maintained contactor to be ineffective to cause the safety means to prevent the initiation of a succeeding cycle by another operation of the other contactors if they are restored before the completion of the cycle.

20. In an electric control system for a machine tool or the like having a cyclically driven element, a source of power and a clutch to drive the driven element, a source of electric current, a plurality of manually operable normally restored operators' contactors disposed to be operated by a plurality of operators, electrically actuatable means arranged to be connected to the current source to be actuated thereby only when all of the operators' contacts have been operated and when actuated effecting operation of the clutch and communicating of power from the power source through the clutch to the driven element to initiate a cycle of movement thereof, controller means operated by the machine to effect maintaining of the communication of power, thereby permitting the contactors to be restored after the driven element has made a predetermined part of a cycle and to effect interruption of the power communication at the end of the cycle of movement, safety means controlled by the contactors and effective to prevent the initiation of a succeeding cycle by the contactors if they are maintained operated until the end of the cycle and rendered ineffective if the contactors are restored before the completion of the cycle, operable means for optionally maintaining a selected contactor in operated condition to eliminate the operator thereof, and means to cause the selected maintained contactor to be ineffective to cause the safety means to prevent the initiation of a succeeding cycle by another operation of the other contactors if they are restored before the completion of the cycle.

21. In an electric control system for a machine tool or the like having a driven element, a source of power to drive the driven element, a source of electric current, a source of fluid pressure, a clutch and a brake device operable by fluid pressure, conduit means for effecting communication between the pressure source and the clutch and brake device, an electro-magnetic valve controlling the conduit means, a plurality of manually operable normally restored operators' contactors, a first electro-magnetically actuable control connected to the current source for energization thereby for effecting operation of the valve to effect operation of the said device to release the brake and set the clutch to effect communication of power from the power source through the clutch to the driven element to drive it and the said first control being energizable only upon operation of all of the contactors, a safety electro-magnetically actuable control connected to the current source for energization thereby and preventing, when in unactuated condition, operation of the valve and power communication to the driven element, controller means operated by the driven element for maintaining energization of the valve and power communication and for maintaining the safety control energized and actuated by current from the source to the end of a cycle of movement of the driven element independently of the contactors after initiation of the cycle by an operation of the contactors and for effecting restoring of the first control to deenergize the valve and interrupt power communication at the end of the cycle and for effecting restoring of the safety control to unactuated condition at the end of the cycle only if the contactors are all maintained operated to the end of the cycle, and circuit means for effecting actuation of the safety control at the end of the cycle only if the contactors are then in restored condition, whereby a succeeding cycle is prevented if the contactors are maintained operated.

22. In an electric control system for a machine tool or the like having a cyclically driven element, a source of power and a clutch to drive the driven element, a source of electric current, a plurality of manually operable operators' contactors disposed to be operated by a plurality of operators and having normally open and normally closed contacts, electrically actuatable control means, electrically actuatable safety means, controller means operated upon movement of the driven element, the safety means being connected to the current source to be actuated thereby through the normally closed contacts, a maintaining circuit for the safety means through the controller means, the actuated safety means permitting the control means to be connected to the current source to be actuated thereby through the normally open contacts upon operation of all of the contactors to close them, the control means when actuated effecting operation of the clutch and communication of power from the power source through the clutch to the machine to initiate a cycle of movement of the driven element, the controller means thereafter being operated to effect maintaining of actuation of the control means to maintain operation of the clutch, thereby permitting the contactors to be restored after the driven element has made a predetermined part of a cycle, and the controller means discontinuing operation of the clutch and effecting interruption of power communication at the end of the cycle, and the controller means effecting restoring of the safety means before the end of the cycle to prevent the initiation of a succeeding cycle by the contactors if they are maintained operated until the end of the cycle, operable means for optionally maintaining a selected contactor in operated condition to eliminate the operator thereof and means to cause the selected maintained contactor to be ineffective to cause the safety means to prevent the initiation of a succeeding cycle by another operation of the other contactors after they have been restored.

23. In an electric control system for a machine tool or the like having a cyclically driven element, a source of power and a clutch to drive the driven element, a source of electric current, a plurality of manually operable operators' contactors disposed to be operated by a plurality of operators and having normally open and normally closed contacts, electrically actuatable control means, electrically actuatable safety means, controller means operated upon movement of the driven element, the safety means being connected to the current source to be actuated thereby through the normally closed contacts, a maintaining circuit for the safety means through the controller means, the actuated safety means permitting the control means to be connected to the current source to be actuated thereby through the normally open contacts upon operation of all of the contactors to close them, the control means when actuated effecting operation of the clutch and communication of power from the power source through the clutch to the machine to initiate a cycle of movement of the driven element, the controller means thereafter being operated to effect maintaining of actuation of the control means to maintain operation of the clutch, thereby permitting the contactors to be restored after the driven element has made a predetermined part of a cycle, and the controller means discontinuing operation of the clutch and effecting interruption of power communication at the end of the cycle, and the controller means effecting restoring of the safety means before the end of the cycle to prevent the initiation of a succeeding cycle by the contactors if they are maintained operated until the end of the cycle, one or more of the operator's contactors comprising means operable to hold the contactor in operated condition to maintain the normally open contacts closed, a local circuit for the normally closed contacts and auxiliary contacts arranged to be manually moved to close the local circuit when the contactor is held in operated condition.

24. In an electric control system for a machine tool or the like having a cyclically driven element, a source of power and a clutch to drive the driven element, a source of electric current, a plurality of manually operable normally restored operators' contactors disposed to be operated by a plurality of operators, electric control means comprising actuable means arranged to be connected to the current source to be actuated thereby only when all of the operators' contactors have been operated and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined part of a cycle, and to effect interruption of the power communication at the end of the cycle of movement, the control means comprising safety means including an electro-magnetic switch the contacts of which control actuation of the actuatable means and the energization of which is controlled by the controller means and being effective to prevent the initiation of a succeeding cycle by the contactors if they are maintained operated until the end of the cycle and rendered ineffective if the contactors are restored before the completion of the cycle, operable means for optionally maintaining a selected contactor in operated condition to eliminate the operator thereof and the control means comprising means to cause the selected maintained contactor to be ineffective to cause the safety means to prevent the inititation of a succeeding cycle by another operation of the other contactors if they are restored before the completion of the cycle.

25. In an electric control system for a machine tool or the like having a cyclically driven element, a source of power and a clutch to drive the driven element, a source of electric current, a plurality of manually operable normally restored operator's contactors disposed to be operated by a plurality of operators, electrically actuatable means arranged to be connected to the current source to be actuated thereby only when all of the operators' contactors have been operated and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined part of a cycle, and to effect interruption of power communication at the end of the cycle of movement, safety means including an electro-magnetic switch the contacts of which control actuation of the actuable means and the energization of which is controlled by the controller means and being effective to prevent the initiation of a succeeding cycle by the contactors if they are maintained operated until the end of the cycle and rendered ineffective if the contactors are restored before the completion of the cycle, operable means for optionally maintaining a selected contactor in operated condition to eliminate the operator thereof, and means to cause the selected maintained contactor to be ineffective to cause the safety means to prevent the initiation of a succeeding cycle by another operation of the other contactors if they are restored before the completion of the cycle.

26. In an electric control system for a machine tool or the like having a cyclically driven element, a source of power and a clutch to drive the driven element, a source of electric current, a plurality of manually operable normally restored operators' contactors disposed to be operated by a plurality of operators, electric control means comprising actuatable means arranged to be connected to the current source to be actuated thereby only when all of the operators' contactors have been operated and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined part of a cycle, and to effect interruption of the power communication at the end of the cycle of movement, the control means comprising safety means including an electro-magnetic switch the energization of which is maintained through the controller means and interrupted thereby before the end of the cycle and the contacts of which, when it is deenergized, effect disconnection of the actuatable means from the current source and thereby prevent the initiation of a succeeding cycle by the contactors if they are maintained operated until the end of the cycle and are rendered ineffective if the contactors are restored before the completion of the cycle, operable means for optionally maintaining a selected contactor in operated condition to eliminate the operator thereof, and the control means comprising means to cause the selected maintained contactor to be ineffective to cause the safety means to prevent the initiation of a succeeding cycle by another operation of the other contactors if they are restored before the completion of the cycle.

27. In an electric control system for a machine tool or the like having a cyclically driven element, a source of power and a clutch to drive the driven element, a source of electric current, a plurality of manually operable normally restored operators' contactors disposed to be operated by a plurality of operators, electrically actuatable means arranged to be connected to the current source to be actuated thereby only when all of the operators' contactors have been operated and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined part of a cycle, and to effect interruption of power communication at the end of the cycle of movement, safety means including an electro-magnetic switch the energization of which is maintained by the controller means and interrupted thereby before the end of the cycle and the contacts of which, when it is deenergized, effect disconnection of the actuatable means from the current source and thereby prevent the initiation of a succeeding cycle by the contactors if they are maintained operated until the end of the cycle and are rendered ineffective if the contactors are restored before the completion of the cycle, operable means for optionally maintaining a selected contactor in operated condition to eliminate the operator thereof, and means to cause the selected maintained contactor to be ineffective to cause the safety means to prevent the initiation of a succeeding cycle by another operation of the other contactors if they are restored before the completion of the cycle.

28. In an electric control system for a machine tool or the like having a cyclically driven element, a source of power and a clutch to drive the driven element, a source of electric current, a plurality of manually operable operators' contactors disposed to be operated by a plurality of operators and having normally open and normally closed contacts, electrically actuatable control means, electrically actuatable safety means, controller means operated upon movement of the driven element, the safety means being connected to the current source to be actuated thereby through the normally closed contacts, a maintaining circuit for the safety means through the controller means, the actuated safety means permitting the control means to be connected to the current source to be actuated thereby through the normally open contacts upon operation of all of the contactors to close them, the control means when actuated effecting operation of the clutch and communication of power from the power source through the clutch to the machine to initiate a cycle of movement of the driven element, the controller means therafter being operated to effect maintaining of actuation of the control means to maintain operation of the clutch, thereby permitting the contactors to be restored after the driven element has made a predetermined part of a cycle, and the controller means discontinuing operation of the clutch and effecting interruption of power communication at the end of the cycle, and the controller means effecting restoring of the safety means before the end of the cycle to prevent the initiation of a succeeding cycle by the contactors if they are maintained operated until the end of the cycle, one or more of the operators' contactors comprising means operable to hold the contactor in operated condition to maintain the normally open contacts closed, and manually operable auxiliary contact means arranged to concurrently bridge the normally closed contacts.

29. In an electric control system for power driven machine tools or the like, a source of electric current, a source of power and a clutch for operating the tool, an electric control for effecting operation of the clutch and application of power from the power source through the clutch to the tool and for interrupting the same, including a control actuating electric circuit, a plurality of operators' contactor mechanisms comprising each normally closed and normally open contacts, control means including the said normally closed contacts and a circuit connected to the current source controlling energization of the control actuating electric circuit, the normally open contacts of the said mechanisms being arranged in series relation, and, when closed by operation of all of the mechanisms, jointly connecting the actuating circuit to the current source, one or more of the operators' contactor mechanisms comprising means to hold the contactor in operated condition to maintain the normally open contacts closed, and manually operable auxiliary contact means arranged to concurrently bridge the normally closed contacts.

30. In an electric control system for a machine tool or the like having a cyclically driven element, a source of power and a clutch to drive the driven element, a source of electric current, a plurality of manually operable normally restored operators' contactors disposed to be operated by a plurality of operators, electrically actuatable means arranged to be connected to the current source to be actuated thereby only when all of the contactors have been operated and when actuated effecting operation of the clutch and communication of power from the power source through the clutch to the driven element to initiate a cycle of movement thereof, controller means operated by the machine to effect maintaining of the power communication, thereby permitting the contactors to be restored after the driven element has made a predetermined part of a cycle, and to effect interruption of power communication at the end of the cycle of movement, safety means including an electro-magnetic switch the energization of which is maintained by the controller means and interrupted thereby before the end of the cycle and the contacts of which, when it is deenergized, effect disconnection of the actuatable means from the current source and thereby prevent the initiation of a succeding cycle by the contactors if they are maintained operated until the end of the cycle and are rendered ineffective if the contactors are restored before the completion of the cycle.

31. In an electric control system for a machine tool or the like having a cyclically driven element, a source of power and a clutch to drive the driven element, a source of electric current, a plurality of manually operable operators' contactors disposed to be operated by a plurality of operators and having normally open and normally closed contacts, electrically actuatable control means, electrically actuatable safety means, controller means operated upon movement of the driven element, the safety means being connected to the current source to be actuated thereby through the normally closed contacts, a maintaining circuit for the safety means through the controller means, the actuated safety means permitting the control means to be connected to the current source to be actuated thereby through the normally open contacts upon operation of all of the contactors to close them, the control means when actuated effecting operation of the clutch and communication of power from the power source through the clutch to the machine to initiate a cycle of movement of the driven element, the controller means thereafter being operated to effect maintaining of actuation of the control means to maintain operation of the clutch, thereby permitting the contactors to be restored after the driven element has made a predetermined part of a cycle, and the controller means discontinuing operation of the clutch and effecting interruption of the power communication at the end of the cycle, and the controller means effecting restoring of the safety means before the end of the cycle to prevent the initiation of a succeeding cycle by the contactors if they are maintained operated until the end of the cycle.

LESTER H. COLBERT.